(12) United States Patent
Venkataraman et al.

(10) Patent No.: US 11,886,474 B2
(45) Date of Patent: Jan. 30, 2024

(54) METHOD AND SYSTEM FOR PROCESSING AMBIGUOUS, MULTI-TERM SEARCH QUERIES

(71) Applicant: VEVEO, INC., Andover, MA (US)

(72) Inventors: Sashikumar Venkataraman, Andover, MA (US); Rakesh Barve, Bangalore (IN); Pankaj Garg, Patiala (IN); Pranav Rajanala, Bangalore (IN); Murali Aravamudan, Windham, NH (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 317 days.

(21) Appl. No.: 16/775,803

(22) Filed: Jan. 29, 2020

(65) Prior Publication Data

US 2020/0272649 A1    Aug. 27, 2020

Related U.S. Application Data

(63) Continuation of application No. 16/432,430, filed on Jun. 5, 2019, now abandoned, which is a continuation
(Continued)

(51) Int. Cl.
*G06F 16/33* (2019.01)
*G06F 16/84* (2019.01)
(Continued)

(52) U.S. Cl.
CPC .......... *G06F 16/334* (2019.01); *G06F 3/0484* (2013.01); *G06F 16/84* (2019.01); *G06F 16/907* (2019.01); *G06F 16/9038* (2019.01)

(58) Field of Classification Search
CPC ................. G06F 16/289; G06F 16/951; G06F 16/90344; G06F 16/3329; G06F 16/3338; G06F 16/90335; G06F 16/90348
See application file for complete search history.

(56) References Cited

U.S. PATENT DOCUMENTS 5,737,608 A    4/1998 Van De Vanter
5,857,212 A    1/1999 Van De Vanter
(Continued)

FOREIGN PATENT DOCUMENTS

EP    1338967 A2    8/2003
JP    2005196663    7/2005
(Continued)

OTHER PUBLICATIONS

IPR2019-00237 Notice of Disposition of Sealed Final Written Decision U.S. Pat. No. 7,779,011, Jun. 30, 2020 (3 pages).
(Continued)

*Primary Examiner* — Apu M Mofiz
*Assistant Examiner* — Cindy Nguyen
(74) *Attorney, Agent, or Firm* — Haley Guiliano LLP (57) ABSTRACT

In accordance with one or more embodiments of the invention, a method and system are provided of processing a search query entered by a user of a device having a text input interface with overloaded keys. The search query is directed at identifying an item from a set of items. Each of the items has one or more associated descriptors. The system receives from the user an ambiguous search query directed at identifying a desired item. The search query is a prefix substring of each of at least two words relating to the desired item. The system dynamically identifies a group of one or more items from the set of items having one or more descriptors matching the search query as the user enters each character of the search query. The system outputs identification of the one or more items of the identified group to be displayed on the device operated by the user.

20 Claims, 9 Drawing Sheets

Related U.S. Application Data of application No. 16/162,990, filed on Oct. 17, 2018, now abandoned, which is a continuation of application No. 14/852,191, filed on Sep. 11, 2015, which is a continuation of application No. 13/854,690, filed on Apr. 1, 2013, now Pat. No. 9,177,081, which is a continuation of application No. 12/869,991, filed on Aug. 27, 2010, now Pat. No. 8,433,696, which is a continuation of application No. 11/235,928, filed on Sep. 27, 2005, now Pat. No. 7,788,266.

(60) Provisional application No. 60/716,101, filed on Sep. 12, 2005, provisional application No. 60/711,866, filed on Aug. 26, 2005.

(51) Int. Cl.
    *G06F 16/907* (2019.01)
    *G06F 16/9038* (2019.01)
    *G06F 3/0484* (2022.01)

(56) References Cited

U.S. PATENT DOCUMENTS

| | | | |
|---|---|---|---|
| 5,896,321 | A | 4/1999 | Miller |
| 6,307,548 | B1 | 10/2001 | Flinchem et al. |
| 6,370,518 | B1 | 4/2002 | Payne et al. |
| 6,501,956 | B1 | 12/2002 | Weeren et al. |
| 6,571,234 | B1 | 5/2003 | Knight et al. |
| 6,801,909 | B2 | 10/2004 | Delgado et al. |
| 6,804,675 | B1 | 10/2004 | Knight et al. |
| 7,117,207 | B1 | 10/2006 | Kerschberg et al. |
| 7,412,441 | B2 * | 8/2008 | Scott, III .............. G06F 16/332 707/E17.073 |
| 7,499,940 | B1 | 3/2009 | Gibbs |
| 7,941,762 | B1 | 5/2011 | Tovino et al. |
| 8,364,540 | B2 | 1/2013 | Soroca et al. |
| 8,527,510 | B2 | 9/2013 | Chen et al. |
| 11,366,820 | B2 | 6/2022 | Aravamudan et al. |
| 11,593,387 | B2 | 2/2023 | Aravamudan et al. |
| 2002/0196163 | A1 | 12/2002 | Bradford |
| 2003/0033295 | A1 | 2/2003 | Adler et al. |
| 2004/0006455 | A1 * | 1/2004 | Fux ...................... G06F 40/216 704/4 |
| 2004/0025180 | A1 | 2/2004 | Begeja et al. |
| 2004/0091236 | A1 | 5/2004 | Boston |
| 2004/0168131 | A1 | 8/2004 | Blumberg |
| 2005/0246365 | A1 | 11/2005 | Lowles |
| 2005/0278741 | A1 | 12/2005 | Robarts et al. |
| 2006/0004744 | A1 | 1/2006 | Nevidomski et al. |
| 2006/0015588 | A1 | 1/2006 | Achlioptas et al. |
| 2006/0212906 | A1 | 9/2006 | Cantalini |
| 2006/0230350 | A1 | 10/2006 | Baluja |
| 2006/0271953 | A1 | 11/2006 | Jacoby |
| 2006/0285665 | A1 | 12/2006 | Wasserblat |
| 2007/0027848 | A1 * | 2/2007 | Howard .............. H04M 1/2748 |
| 2007/0156747 | A1 | 7/2007 | Samuelson et al. |
| 2008/0132259 | A1 | 6/2008 | Vin |
| 2008/0177994 | A1 | 7/2008 | Mayer |
| 2008/0215623 | A1 | 9/2008 | Ramer et al. |
| 2008/0295132 | A1 | 11/2008 | Icho |
| 2009/0006543 | A1 | 1/2009 | Smit |
| 2009/0125602 | A1 | 5/2009 | Bhatia |
| 2009/0144208 | A1 | 6/2009 | Blust et al. |
| 2012/0136886 | A1 | 5/2012 | Brewer et al. |

FOREIGN PATENT DOCUMENTS

| | | |
|---|---|---|
| JP | 2007102484 | 4/2007 |
| WO | WO2008062547 | 5/2008 |

OTHER PUBLICATIONS

IPR2019-00239 Final Written Decision U.S. Pat. No. 7,779,011, Jun. 30, 2020 (69 pages).
IPR2019-00290 Notice of Disposition of Sealed Final Written Decision U.S. Pat. No. 7,937,394, Jun. 30, 2020 (3 pages).
IPR2019-00292 Final Written Decision U.S. Pat. No. 7,937,394, Jun. 30, 2020 (69 pages).
IPR2019-00237 Final Written Decision U.S. Pat. No. 7,779,011, Aug. 12, 2020 (80 pages).
IPR2019-00290 Final Written Decision U.S. Pat. No. 7,937,394, Aug. 12, 2020 (79 pages).
Nardi et al., "Integrating communication and Information Through ContactMap," Communications of the ACM, 45 (4):89-95 (2002).
Turski et al., "Inner Circle: People Centered Email Client," CHI 2005 Conference on Human Factors in Computing Systems, pp. 1845-1848 (2005).

* cited by examiner

| The Koala Brothers: Archie's Loose Tooth; Pe |
| The Koala Brothers: George's Day Off; Archie |
| The Koala Brothers: Alice Rides Again; Ned |
| Charlie and Lola: I'm Not Feeling Well |
| Rockos Modern Life: Junk Junkies; Day of the |
| Rockos Modern Life: Born to Spawn; Uniform |
| Charlie and Lola: It's My Book |

INPUT TERM: 5 (J)

| The Koala Brothers: Archie's Loose Tooth; Pe |
| The Koala Brothers: George's Day Off; Archie |
| Rockos Modern Life: Born to Spawn; Uniform |
| The New Adventures of Winnie the Pooh; Ee |
| Charlie and Lola: My Wobbly Tooth |
| Charlie and Lola: The Most Wonderfullest Pic |
| Lizzie McGuire: Educating Ethan |

INPUT TERM: 5 86 (J TO)

METHOD AND SYSTEM FOR PROCESSING AMBIGUOUS, MULTI-TERM SEARCH QUERIES

RELATED APPLICATIONS

This application is a continuation of U.S. patent application Ser. No. 16/432,430, filed Jun. 5, 2019 (currently pending), which is a continuation of U.S. No. Ser. 16/162, 990, filed Oct. 17, 2018 (abandoned), which is a continuation of U.S. Ser. No. 14/852,191, filed Sep. 11, 2015 (abandoned), which is a continuation of U.S. patent application Ser. No. 13/854,690, filed Apr. 1, 2013, now U.S. Pat. No. 9,177,081, issued Nov. 3, 2015, which is a continuation of U.S. patent application Ser. No. 12/869,991, filed Aug. 27, 2010, now U.S. Pat. No. 8,433,696, issued Apr. 30, 2013, which is a continuation of U.S. patent application Ser. No. 11/235,928, filed Sep. 27, 2005, now U.S. Pat. No. 7,788, 266, issued Aug. 31, 2010 which claims the benefit under 35 U.S.C. § 119(e) of U.S. Provisional Patent Application Ser. Nos. 60/716,101, filed Sep. 12, 2005, now expired and U.S. Provisional Patent Application No. 60/711,866, filed Aug. 26, 2005, now expired which are all incorporated by reference herein in their entirety.

BACKGROUND OF THE INVENTION

Field of Invention

The present, invention generally relates to processing search queries and, more particularly, to methods and systems for processing ambiguous, reduced text, multi-term search queries.

Description of Related Art

There are many user-operated devices such as mobile phones, PDAs (personal digital assistants), and television remote control devices that have small keypads, which a user can use for text entry. In many of these devices, largely because of device size restrictions, the keypad is small and has only a small number of keys, which are overloaded with alpha-numeric characters. Text input using these keypads is cumbersome.

Figure 1:
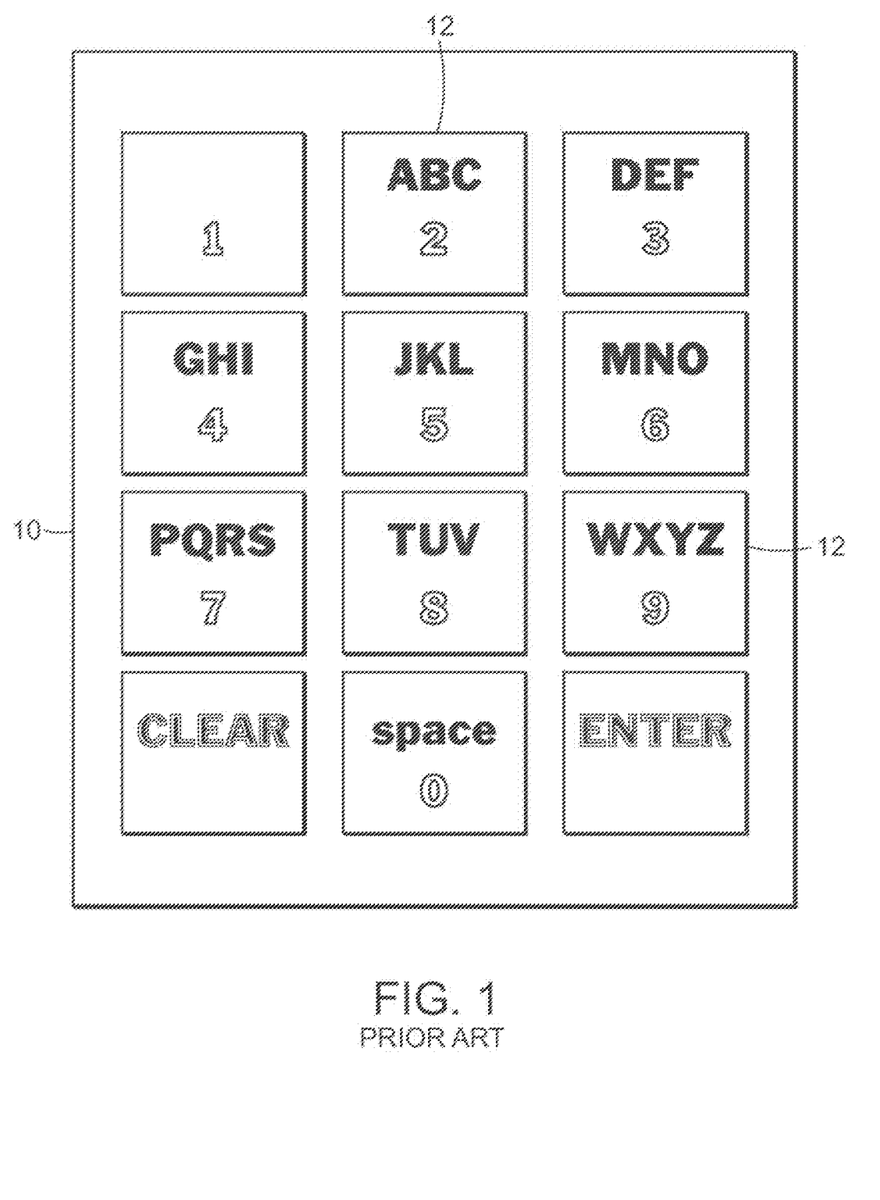
FIG. 1 illustrates a keypad with overloaded keys in accordance with the prior art.

FIG. 1 illustrates a common twelve-key keypad interface found in many cell phones and other mobile devices, and also increasingly in television remote control devices. The keypad 10 includes twelve keys 12, most of which are overloaded with multiple alpha-numeric characters or functions. The same key can be used to enter different characters. For instance, the "2" key can be used to enter the number "2" and the letters "A", "B" and "C". Text entry using such a keypad with overloaded keys can result in an ambiguous text entry, which requires some type of a disambiguation action. For instance, with a multi-press interface, a user can press a particular key multiple times in quick succession to select a desired character (e.g., to choose "B", the user would press the "2" key twice quickly, and to choose "C", the user would press the key three times). Alternatively, text entry can be performed using T9 and other text input mechanisms that provide vocabulary based completion choices for each word entered. Neither of these methods is however particularly useful for performing searches because of the number of steps needed to get to the result. One deficiency of the multi-press interface is that too many key strokes are needed. A drawback of applying a vocabulary based word completion interface is the need for the additional step of making a choice from a list of all possible word matches generated by the ambiguous text input. Furthermore vocabulary based word disambiguation systems are designed typically for composition applications (as opposed to search applications) where user explicitly disambiguates each word by performing a word completion action to resolve that word before proceeding to the next word in the composition.

BRIEF SUMMARY OF EMBODIMENTS OF THE INVENTION

In accordance with one or more embodiments of the invention, a method and system are provided of processing a search query entered by a user of a device having a text input interface with overloaded keys. The search query is directed at identifying an item from a set of items. Each of the items has one or more associated descriptors. The system receives from the user an ambiguous search query directed at identifying a desired item. The search query comprises a prefix substring of each of at least two words relating to the desired item. The system dynamically identifies a group of one or more items from the set of items having one or more descriptors matching the search query as the user enters each character of the search query. The system outputs identification of the one or more items of the identified group to be displayed on the device operated by the user.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF EMBODIMENTS OF THE INVENTION

Briefly, methods and systems are provided in accordance with various embodiments of the invention for performing searches using ambiguous text input from devices having limited text input interfaces.

As described in further detail below, in accordance with various embodiments of the invention, methods and systems are provided for processing a search query entered by a user of a device having a text input interface with overloaded keys. The search query is directed at identifying an item from a set of items. Each of the items has one or more associated descriptors. The descriptors can include words in the name of the item or other information relating to the item. For example, in a television application, the item can be a television content item such as a movie, and the descriptors can be information on the title of the movie, the cast, directors, and other keywords and descriptions of the movie.

Using the text input interface, the user can enter an ambiguous search query directed at identifying a desired item. The search query comprises a prefix substring of each of at least two words relating to the desired item. A prefix substring of a word is a variable length string of characters that contains fewer than all the characters making up the word.

The system dynamically identifies a group of one or more items from the set of items having one or more descriptors matching the search query as the user enters each character of the search query. The group of the one or more items is displayed on the device operated by the user. The items are preferably displayed in an order of expected interest to the user.

The user types in the multiple term prefix input query by pressing overloaded keys of the text input interface once to form an ambiguous query string. In accordance with one or more embodiments of the invention, the search space is initially indexed by performing a many-to-many mapping from the alphanumeric space of terms to numeric strings corresponding to the various prefixes of each alphanumeric term constituting the query string. In a numeric string, each alphanumeric character in the string is replaced by its corresponding numeric equivalent based on, e.g., the arrangement of characters on the commonly used twelve-key reduced keypad shown in FIG. 1. This mapping scheme enables the system in accordance with one or more embodiments to incrementally retrieve results matching the ambiguous alphanumeric input query, as the user types in each character of the query. The user does not have to explicitly specify the termination of each term to assist the system in disambiguating the input query; instead, the user only enters an input query that includes prefix substrings from multiple terms. The system can leverage off the multiple term prefixes to disambiguate it. The multiple term prefix based disambiguation method in accordance with one or more embodiments of the invention reduces the amount of text and steps needed to enter a multiple term input query and retrieve results.

There are various possible applications for the search techniques described herein including, e.g., assisting television viewers in identifying desired television content items and channels, and assisting users of mobile devices such as cell phones and PDAs in performing searches for items in various databases (e.g., performing searches in directories of people or businesses, and searching for and purchasing products/services like airline tickets).

In the context of television systems, the term "television content items" can include a wide variety of video/audio content including, but not limited to, television shows, movies, music videos, or any other identifiable content that can be selected by a television viewer. Searching for television content items can be performed across disparate content sources including, but not limited to, broadcast television, VOD, IPTV, and PVR (local and network).

Figure 2:
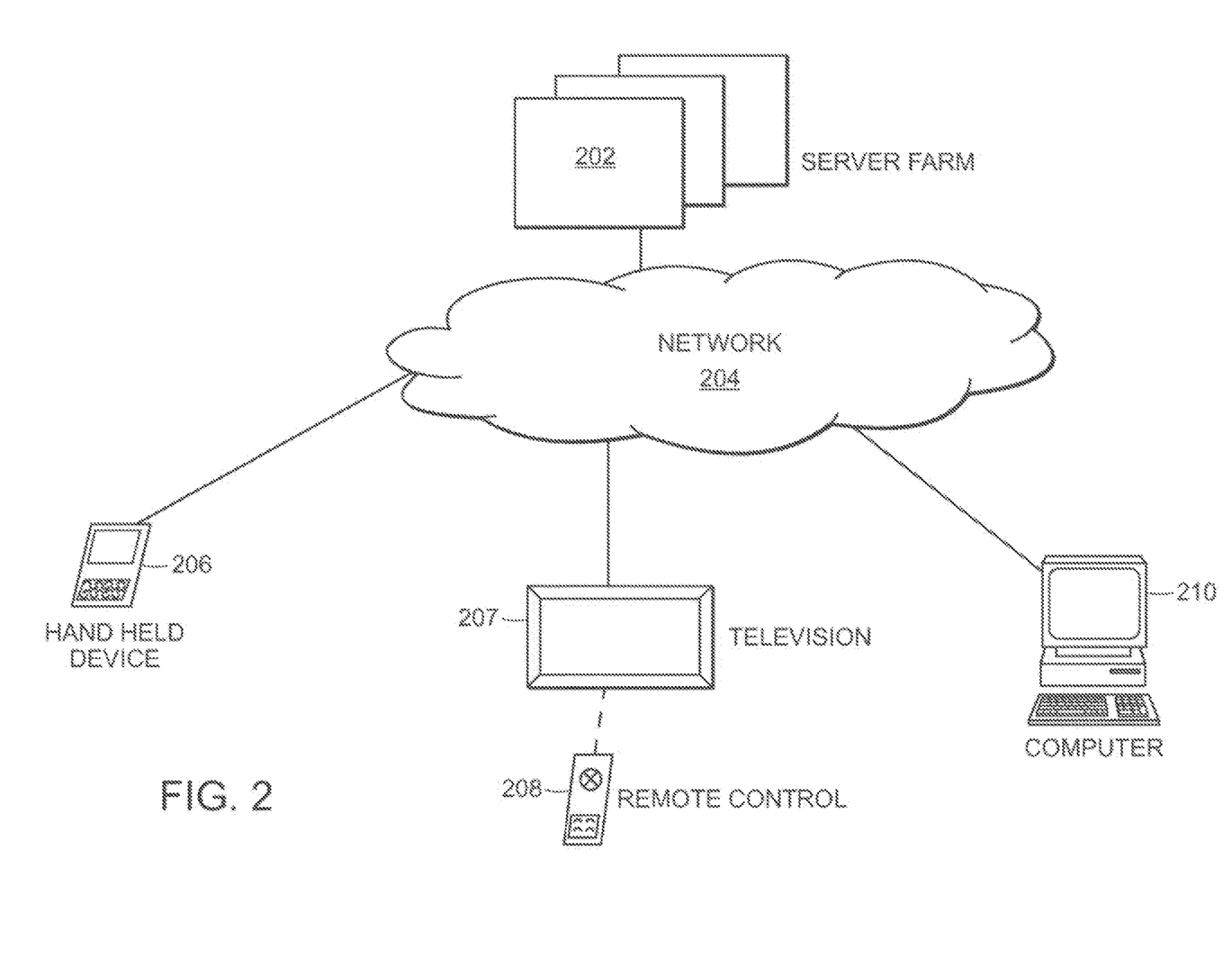
FIG. 2 illustrates a search system in accordance with one or more embodiments of the invention.

FIG. 2 schematically illustrates an overall system for performing searches with reduced text entry using various devices in accordance with one or more embodiments of the invention. The system includes a server farm or system 202, a network 204, and a variety of devices 206, 208, 210 operated by users with text input interfaces. In accordance with one or more embodiments of the invention, the server 202 processes search queries received from the user devices 206, 208, 210. In other embodiments, the search queries are processed on the devices themselves. As discussed below, the server 202 can be the source of search data and relevance updates. If part of a television system, the server 202 can also be the source of or be linked to a source of at least some of the available television content (e.g., a cable or satellite television operator).

The network 204 functions as the distribution framework for transmitting data from the server 202 to the devices operated by the users. The distribution network 204 could be wired or wireless connections or some combination thereof. Examples of possible networks include computer networks, cable television networks, satellite television networks, IP-based television networks, and mobile communications networks (such as, e.g., wireless CDMA and GSM networks).

The search devices could have a wide range of interface capabilities. A device, e.g., could be a hand-held mobile communications device 206 such as a phone or PDA having a limited display size and a reduced keypad with overloaded keys. Another type of search device is a television system 207 with a remote control device 208 having an overloaded keypad. Another possible search device is a Personal Computer (PC) 210 with a full or reduced keyboard and a computer display.

Figure 3:
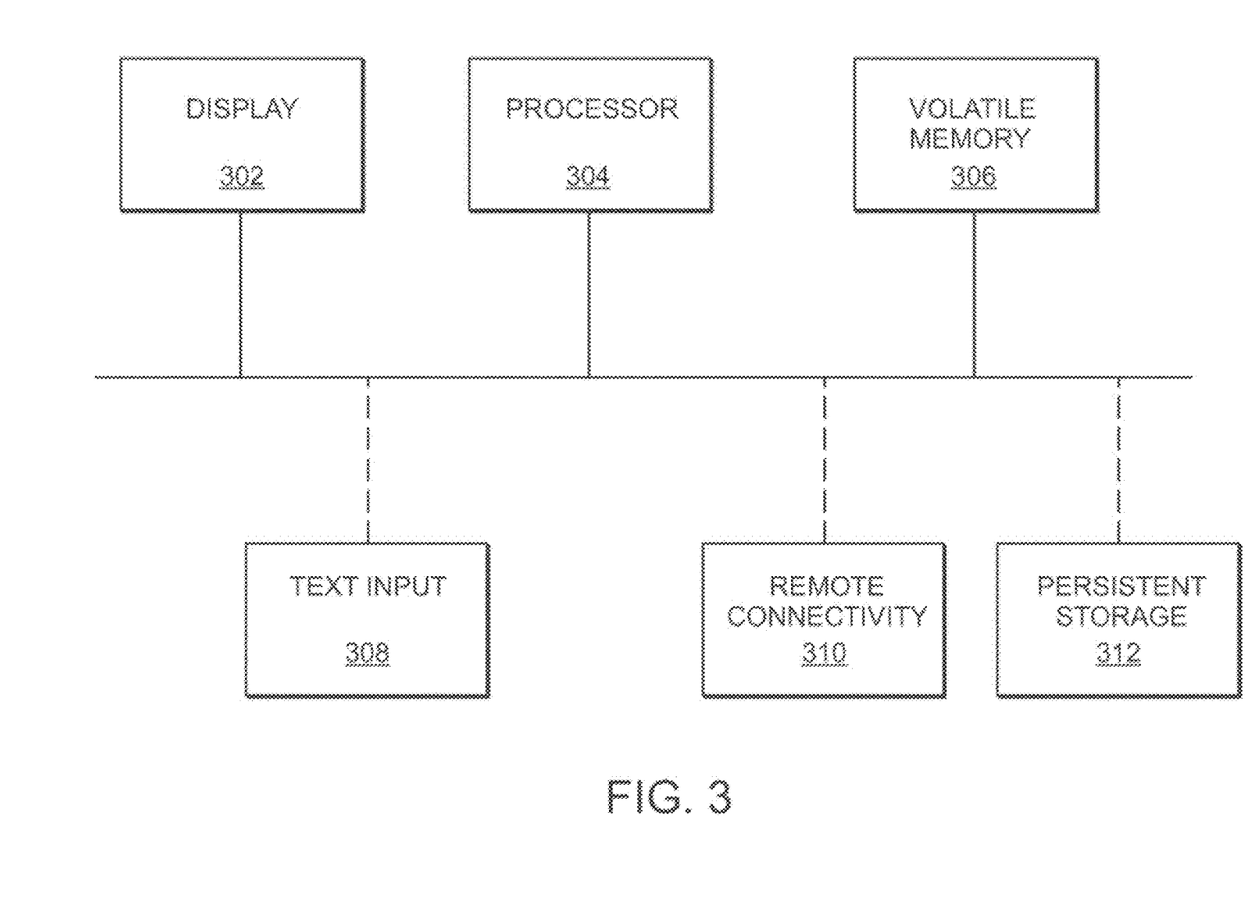
FIG. 3 illustrates various device configuration options for a device for performing searches in accordance with one or more embodiments of the invention.

FIG. 3 illustrates multiple exemplary configurations for search devices in accordance with various embodiments of the invention. In one configuration, a search device (e.g., PC 210) can have a display 302, a processor 304, volatile memory 306, text input interface 308, remote connectivity 310 to the server 202 through the network 204, and a persistent storage 312. A device configuration for a device such as the hand-held device 206 might not include local persistent storage 312. In this case, the device 206 could have remote connectivity 310 to submit the query to the server 202 and retrieve results from it. Another configuration of the devices 206, 208, 210 may not have remote connectivity 310. In this case, the search database may be locally resident on a local persistent storage 312. The persistent storage 312 may be, e.g., a removable storage element such as SD, SmartMedia, CompactFlash card etc. In a configuration of the device with remote connectivity 310 and persistent storage 312 for performing searches (e.g., a television system 207), the device may use the remote connectivity for search relevance data update or for the case where the search database is distributed on the local storage 312 and on the server 202. A preferred configuration in a memory constrained device is the search data residing remotely on a server. Unlike composition applications where the "most frequently used or popular terms space" are small in size and can be maintained in a local vocabulary, search spaces are typically larger inherently because people instinctively use "unique word signatures" to recall a document of interest. Hence maintaining search spaces locally may not be practical in many devices that have insufficient local memory, making a network based search configuration preferable.

In one exemplary embodiment, a television system 207 may have a set-top box or other device with a one-way link to a satellite network. In this configuration, all search data including relevance updates may be downloaded to the device through a satellite link to perform local searching. In this case, the set-top box preferably has sufficient storage capacity to maintain search spaces locally. Local storage is preferably large in this case to circumvent the deficiency of a one-way link.

Figure 4:
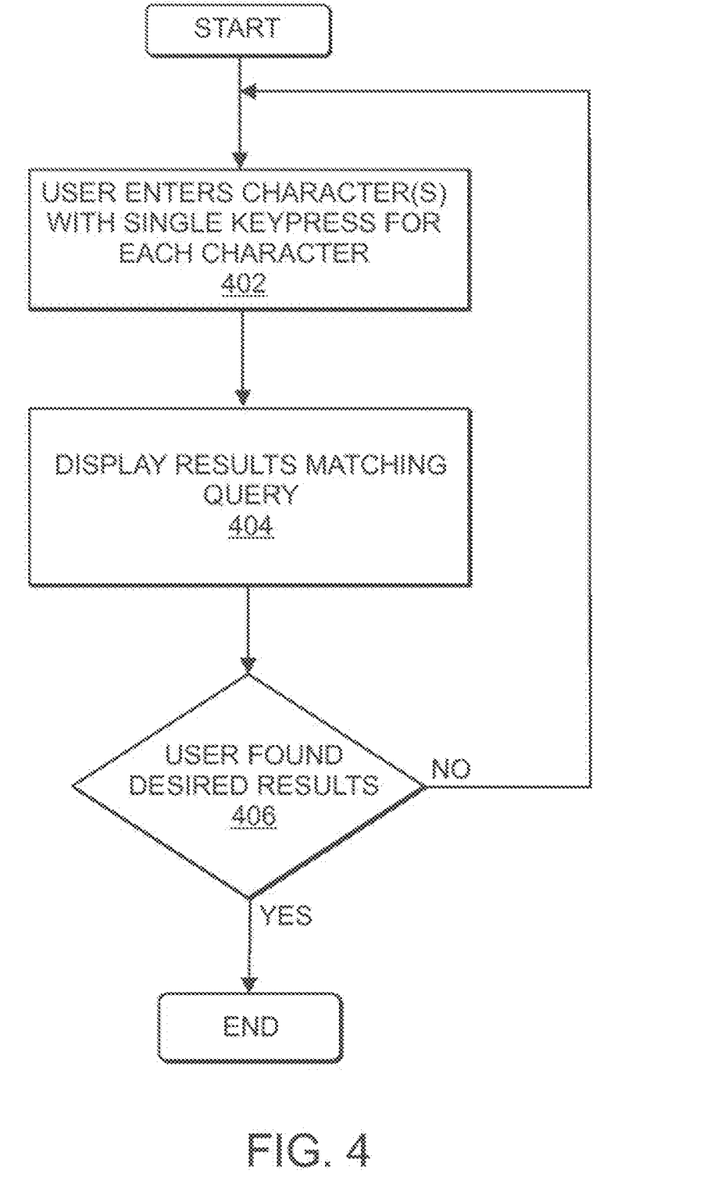
FIG. 4 is a flow chart illustrating a method for finding results with reduced text entry using an overloaded keypad in accordance with one or more embodiments of the invention.

FIG. 4 illustrates a search process in accordance with one or more embodiments of the invention. At step 402, the user enters a character using an ambiguous text input interface, e.g., using a keypad with overloaded keys where a single key press is performed for each character entered. At 404, an incremental search system determines and displays results that match the input character entered at 402. Since the input is ambiguous, the match of results would include the matches for all the ambiguous input characters represented by the single key press. To address this increased set of matches, an ordering scheme is preferably used to order the results to improve accessibility to results expected to be more of interest to the user. The ordering of results can be based on a variety of criteria including, e.g., temporal relevance, location relevance, popularity and personal preferences (that may have been determined implicitly or explicitly) or some combination of these criteria. (In a television application, temporal relevance can be used to favor programs whose timing may be more of interest to the viewer. For example, if the user entered NBA, then the system would list the games in order of temporal relevance such as those in progress or are scheduled to begin in the near future are listed at the higher on the list. The popularity criterion can be used to favor programs or channels that are more popular than others. The personal preference criterion can be used to favor programs or channels that the user has indicated preference for in prior user selections. For example, if a user frequently scrolls down to "CNBC" and selects it, the system would over time place CNBC higher in the list of results over a more generally popular channel such as CNN. Furthermore, identity independent time-based usage pattern learning algorithms can be applied in conjunction with personalization to apply the results ordering rules in an appropriate context, Also, e.g., when using a PDA or cell phone to search for a business, the system may use location relevance as part of the ordering criteria.)

In addition, other ordering schemes can also or instead be used such as, e.g., character count based subspace biasing, examples of which are described in U.S. Patent Application Ser. No. 60/695,463 entitled "Method And System For Incremental Search With Minimal Text Entry On Television Where The Relevance Of Results Is A Dynamically Computed Function Of User Input Search String Character Count" and filed on Jun. 30, 2005, which is assigned to the assignee of the present application and is incorporated by reference herein in its entirety.

The ordering criteria can give preference to the results matching the search query based on a lexical match, of the type of query input, e.g., in the following order of preference: single term prefixes, multiple term prefixes, and lastly abbreviation matches.

If the user does not find the desired results at 406, he or she can continue to enter more characters to the search query at step 402. Then at step 404, the system will perform the search based on the cumulative substring of characters of the search query entered by the user up to that point.

Figure 5:
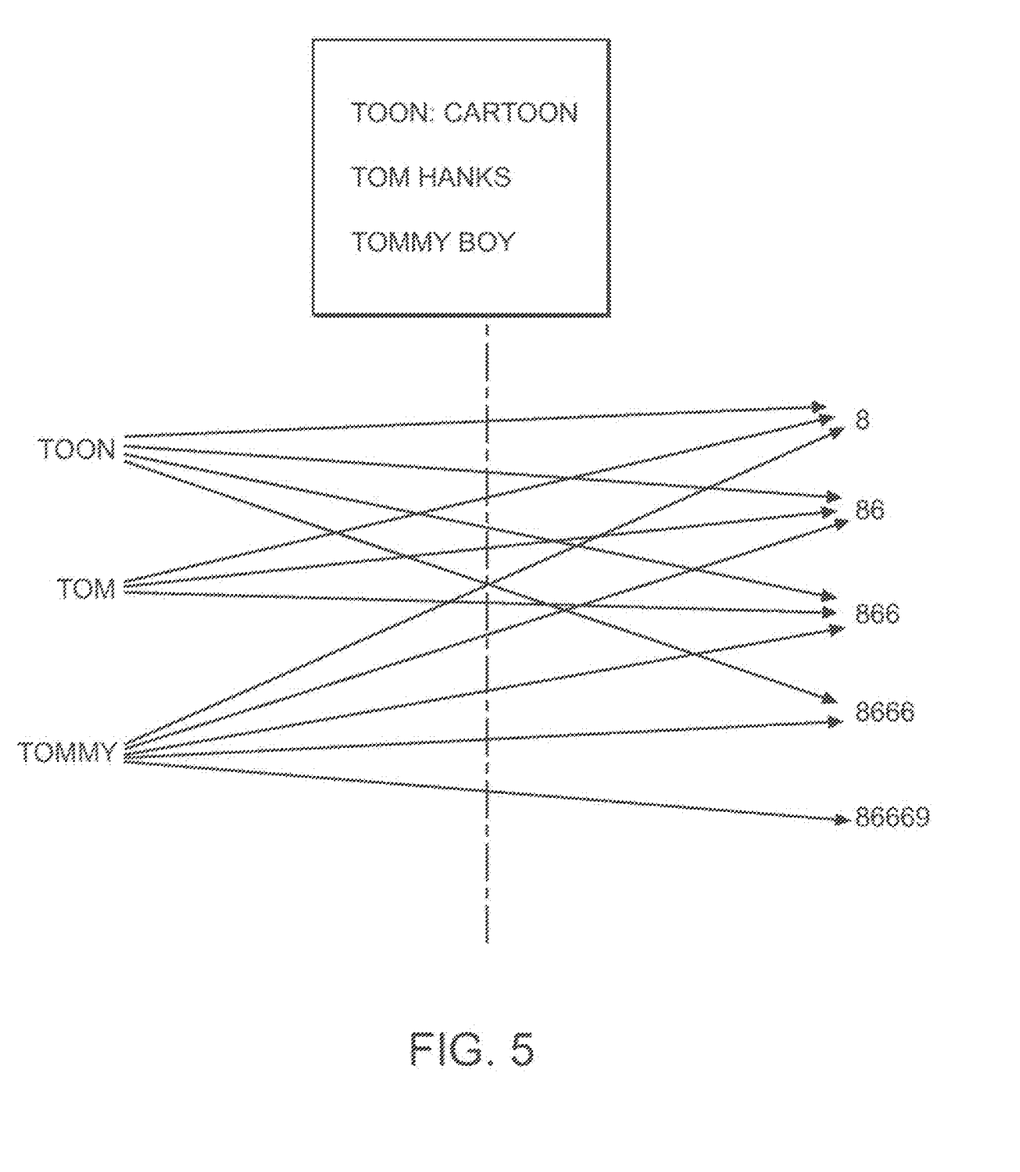
FIG. 5 illustrates a many-to-many mapping of terms to the numeric equivalents.

FIG. 5 illustrates an example of the many-to-many mapping scheme from an alphanumeric terms space to a numeric string space. The exemplary terms "TOON", "TOM", "TOMMY", which can be search terms entered by a television viewer to identify television content, are mapped to the numeric equivalents of their prefix strings: "T"(8), "TO"(86), "TOO"(866), "TOON"(8666), "TOMMY" (86669). This many-to-many mapping scheme enables incremental search processing by enabling even a single character entered by the user to retrieve relevant results. This many-to-many mapping is done during an indexing phase for all terms that can be used to discover a result.

Figure 6:
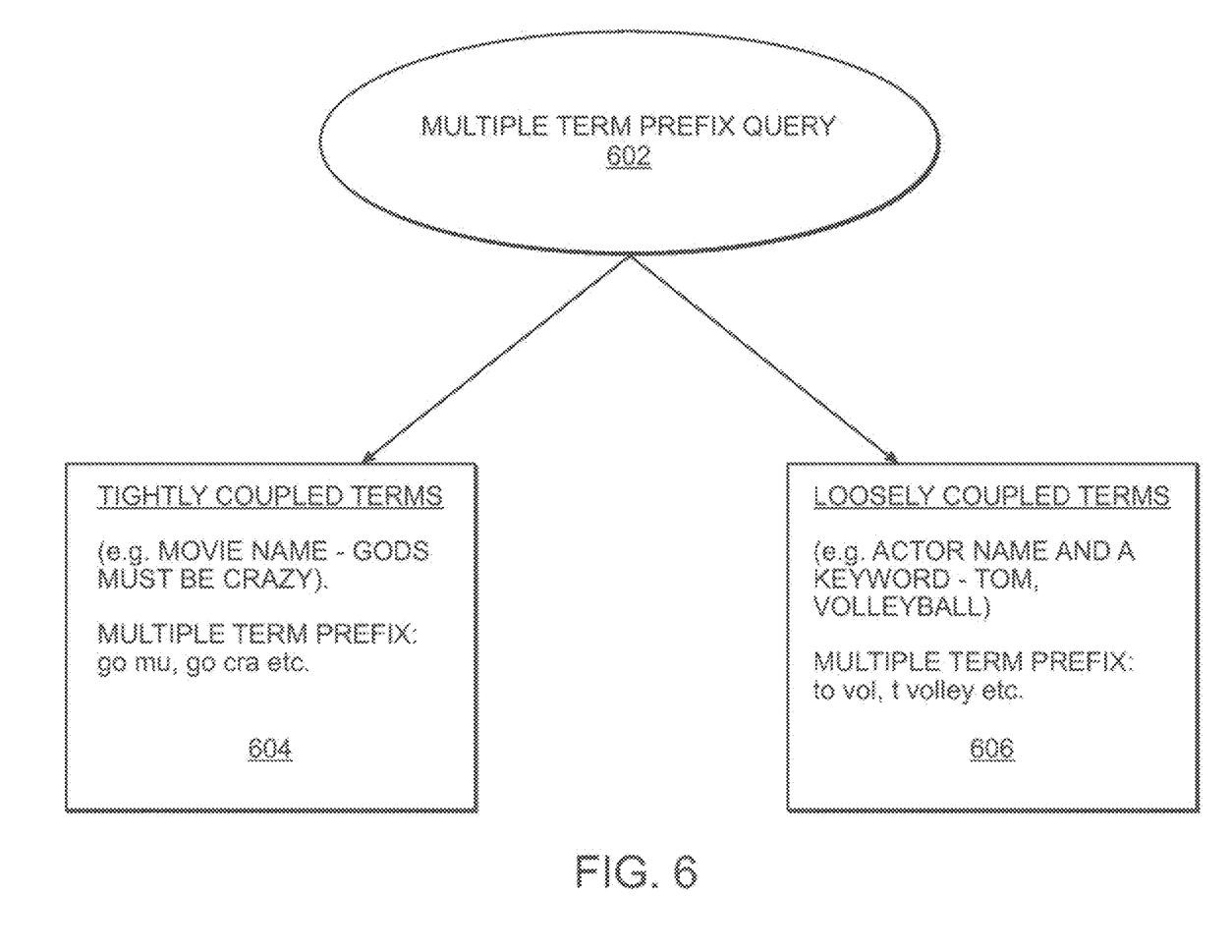
FIG. 6 illustrates the two different couplings between multiple terms in a query.

FIG. 6 illustrates the two broad categories of multiple prefix terms 602 that can be used in search queries. The terms 602 can be tightly coupled terms 604, which are closely related such the terms from movie title or name of a person (e.g., all the terms in the names Gods Must Be Crazy, and Harrison Ford). The terms may be either ordered or unordered (e.g., Ford Harrison or Harrison Ford). Loosely coupled terms 606, on the other hand, are terms that are semantically related, e.g., as in the terms "Tom Volleyball" (Tom Hanks playing a role in a movie cast away with volleyball being a keyword). The prefix based multiple terms input described herein, in addition to being an intuitive mechanism for reduced text input significantly reduces the size of the result space compared to other search techniques in which any query substring could match with results. With these other search techniques, the ambiguity in input could significantly increase the result space size, particularly when the number of characters input is low. This would force the user to enter more characters and diminish the effectiveness of the search process.

Figure 7:
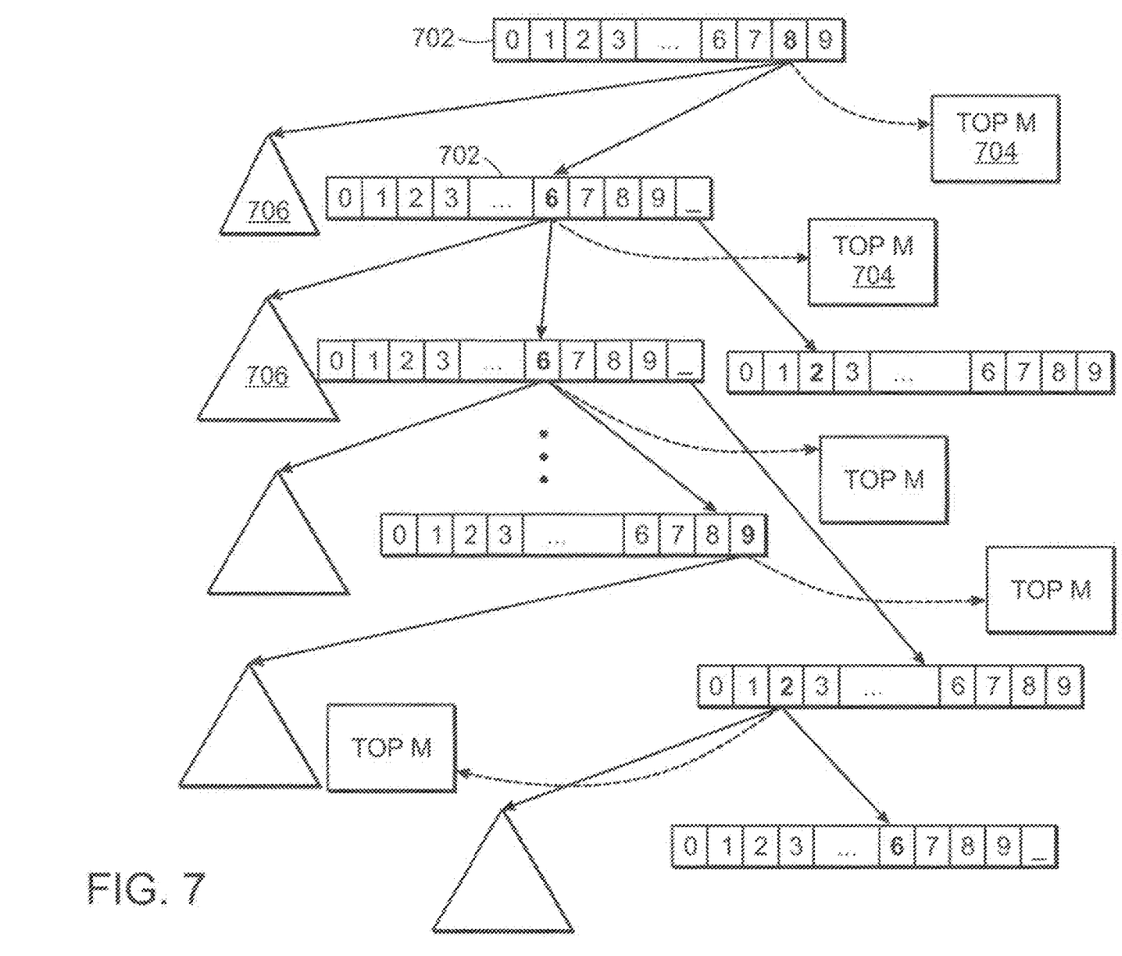
FIG. 7 illustrates a data structure for retrieving results incrementally for each character input using the many-to-many mapping scheme in accordance with one or more embodiments of the invention.

FIG. 7 illustrates a trie data structure that can be used in identifying search results in accordance with one or more embodiments of the invention. Each node 702 of the structure has numerical values from 0-9. Each node has the top M records 704 (determined from some ordering criteria) preferably in "in-memory" storage, which can be a memory that permits quick retrieval. These records are returned immediately to user based on the match string. The illustrated diagram shows the layout of the data structure for the terms "TOMMY BOY". The number of prefix terms and the size of the prefix terms used for pre-computing the trie index are determined by the memory availability and computational capabilities of the system. One example of a trie structure used for incremental searching is described in U.S. patent application Ser. No. 11/136,261 entitled "Method And System For Performing Searches For Television Content Using Reduced Text Input", which is incorporated by reference herein in its entirety. In the FIG. 7 example, the size of the prefix terms used is 2 and the number of terms for pre-computing the trie index is 2. So when the user enters any of the search queries, "8 269"(T BOY),"86 269"(TO BOY), "8 2"(T B), "86 2"(T BO), the results would be retrieved from the top M records 704 if present there. If it is beyond the top M records, the records are retrieved from the secondary storage structure 706 if it is present there. If the results are not found in the secondary structure either, the system can perform an intersection of the top "N" records (N>=M) for the individual terms, in this case, e.g., "T BOY". In preferred embodiments of the invention, the system would return the results obtained both from the trie walk (where results are obtained either from the top "M" records or from the secondary memory) and from the intersection method, where the intersection method would be deployed once the input character count exceeds a given threshold. The multiple prefix terms based search is thus realized in accordance with one or more embodiments of the invention preferably by the combination of a (1) trie walk whose strength and efficiency is highest when input character count is low, and (2) an intersection process whose strength and efficiency is highest when the input character count is above a given threshold.

One characteristic of this method of multiple prefix terms based search in accordance with one or more embodiments of the invention is the absence of an explicit term/word termination action. In other words, the system does not require each word in a search entry to be successively and separately resolved. The system in accordance with one or more embodiments of the invention disambiguates the input by leveraging off the multiple terms (both in the case of loosely coupled and tightly coupled terms).

Figure 8A:
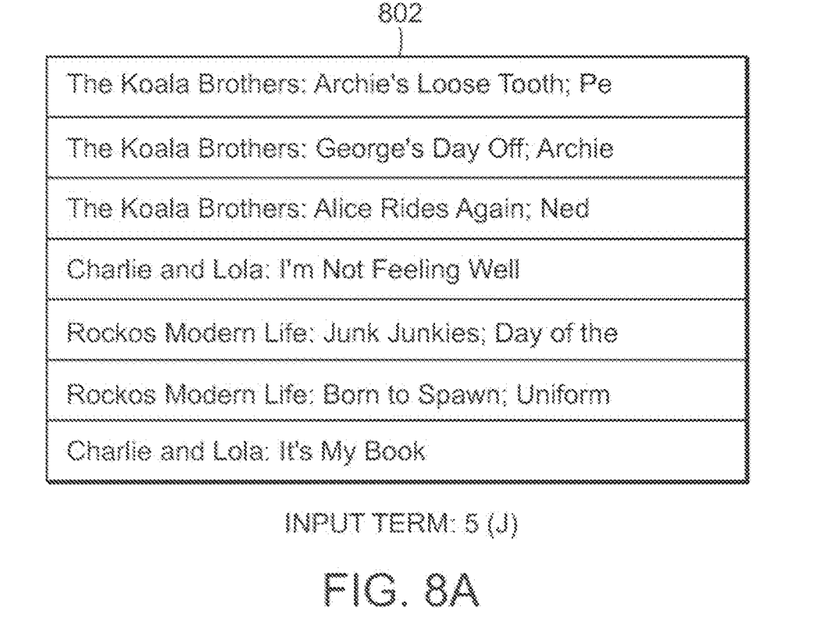
FIGS. 8A to 8C illustrate the incremental results retrieved when a user enters characters in a search query in accordance with one or more embodiments of the invention.
Figure 8B:
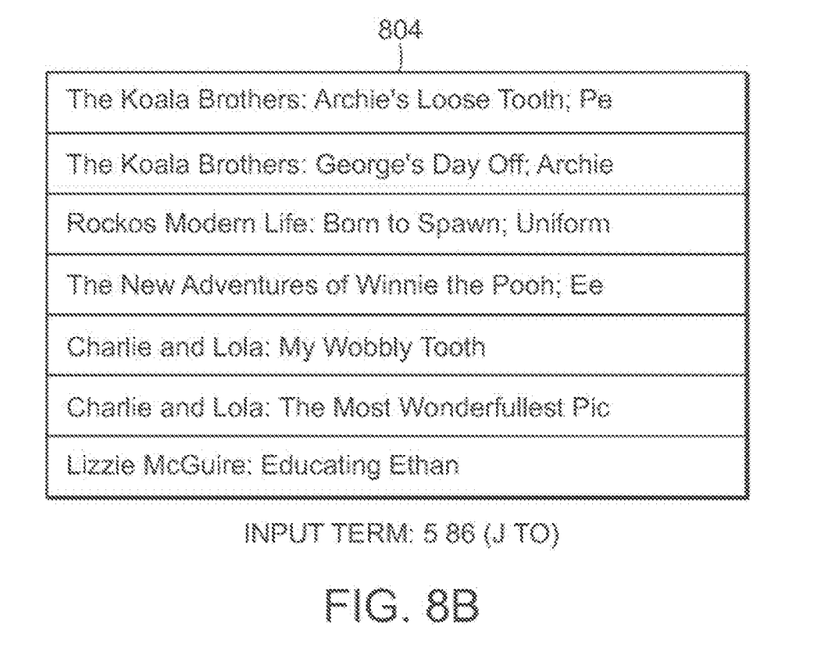
Figure 8C:
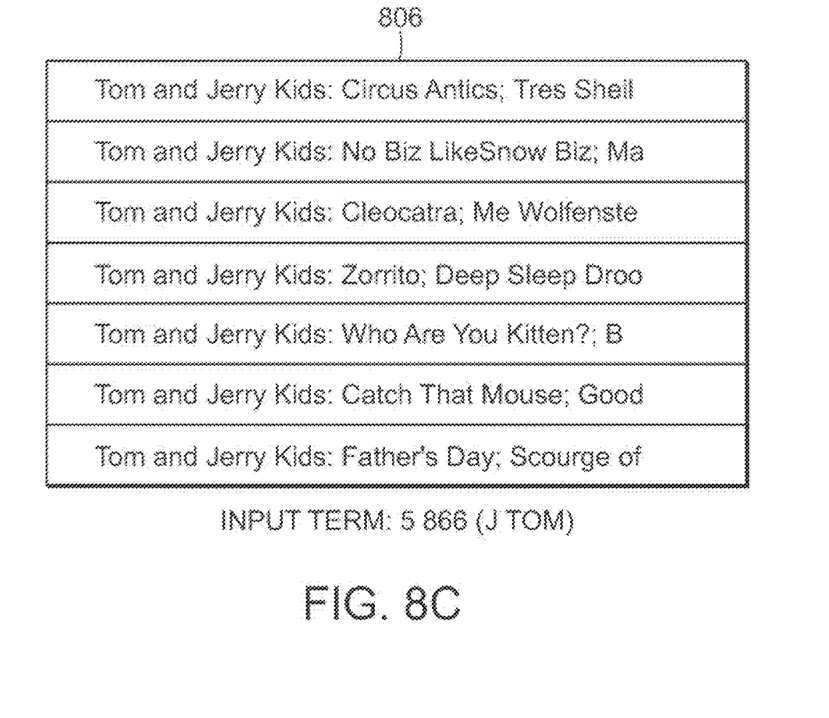

FIGS. 8A-8C illustrate the incremental results obtained for an exemplary search query as characters of the query are input by a user in a television application. In FIG. 8A, the user has input a single character "5" with the intention that the character represent the letter "J". In this example, the user's intent is to find "Tom and Jerry" television programs, and starts with entering "Jerry" in an unordered input. However, there are multiple matches for different terms due to the input ambiguity since the single button pressed represents several characters, in this case results relate to Koala, Lola, Life etc. These terms are ordered in the displayed results list 802, e.g., by the popularity of the matching document and the relevance of the matching term to the document, and displayed on the users' television screen.

As the user has not found the desired content relating to Tom and Jerry, he or she enters additional characters in the search query. As shown in FIG. 8B, the user enters a multiple term text input: "5 86", which is intended to represent the letters "J TO". The results for this query are shown at 804. Because of the input ambiguity ([Koala, Tooth], [Hallie Todd in cast for Lizzie McGuire] etc.), matches for several unrelated programs are retrieved and displayed.

As shown in FIG. 8C, the user then inputs a further character in the search query: "5 866", which is intended to represent "J TOM". With this further character input, the system is able to identify the content of interest, and displays the results in list 806.

Methods of processing ambiguous search query inputs from users in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method for indexing items for reduced input searching comprising:
    retrieving a string of alphanumeric symbols corresponding to a content item, wherein the string of alphanumeric symbols comprises a first word and a second word;
    selecting a first prefix of the first word and a second prefix of the second word;
    identifying, based on a character map for an overloaded keypad, a first string of keystrokes mapping to the first prefix and a second string of keystrokes mapping to the second prefix;
    generating an index string of keystrokes by concatenating the first string of keystrokes with a delimiting keystroke and with the second string of keystrokes;
    associating the content item with the index string of keystrokes;
    receiving a search string of keystrokes from the overloaded keypad; and
    in response to determining that the search string of keystrokes matches the index string of keystrokes, generating for display the content item.

2. The method of claim 1, wherein at least one key of the overloaded keypad is associated with at least two alphanumeric symbols.

3. The method of claim 1, wherein generating for display the content item comprises:
    accessing a database entry corresponding to the content item;
    identifying a plurality of descriptors associated with the content item; and
    generating for display a listing comprising a descriptor of the plurality of descriptors associated with the content item.

4. The method of claim 1, wherein the content item is a first content item, and wherein the string of alphanumeric symbols is a first string of alphanumeric symbols, further comprising:
    retrieving a second string of alphanumeric symbols corresponding to a second content item, wherein the second string of alphanumeric symbols comprises a third word and a fourth word; and
    associating the second content item with the index string of keystrokes in response to determining that the first prefix matches the third word and that the second prefix matches the fourth word.

5. The method of claim 4, wherein generating for display the content item comprises generating for display a first listing corresponding to the first content item and a second listing corresponding to the second content item.

6. The method of claim 4, wherein associating the second content item with the index string of keystrokes comprises:
    determining an ordering criteria associated with the first content item and the second content item;

determining a first ranking score for the first content item and a second ranking score for the second content item based on the ordering criteria; and associating the first ranking score with the first content item and the second ranking score with the second content item.

7. The method of claim 6, wherein the ordering criteria includes at least one of a temporal relevance, a location relevance, a popularity, and a personal preference.

8. The method of claim 6, wherein generating for display the content item comprises generating for display a first listing corresponding to the first content item and a second listing corresponding to the second content item, wherein the first listing and the second listing is ordered based on the ranking.

9. The method of claim 6, further comprising:

determining whether the first ranking score exceeds a threshold ranking score;

in response to determining that the first ranking score exceeds the threshold ranking score, associating the first content item with a first list of content items; and in response to determining that the first ranking score does not exceed the threshold ranking score, associating the first content item with a second list of content items.

10. The method of claim 9, wherein the first list of content items is stored on a first storage medium and wherein the second list of content items is stored on a second storage medium, wherein a first data retrieval speed of the first storage medium exceeds a second data retrieval speed of the second storage medium.

11. A system for indexing items for reduced input searching comprising:

an overloaded keypad; and control circuitry configured to:

retrieve a string of alphanumeric symbols corresponding to a content item, wherein the string of alphanumeric symbols comprises a first word and a second word;

select a first prefix of the first word and a second prefix of the second word;

identify, based on a character map for the overloaded keypad, a first string of keystrokes mapping to the first prefix and a second string of keystrokes mapping to the second prefix;

generate an index string of keystrokes by concatenating the first string of keystrokes with a delimiting keystroke and with the second string of keystrokes;

associate the content item with the index string of keystrokes;

receive a search string of keystrokes from the overloaded keypad; and in response to determining that the search string of keystrokes matches the index string of keystrokes, generate for display the content item.

12. The system of claim 11, wherein at least one key of the overloaded keypad is associated with at least two alphanumeric symbols.

13. The system of claim 11, wherein the control circuitry is further configured, when generating for display the content item, to:

access a database entry corresponding to the content item;

identify a plurality of descriptors associated with the content item; and generate for display a listing comprising a descriptor of the plurality of descriptors associated with the content item.

14. The system of claim 11, wherein the content item is a first content item, and wherein the string of alphanumeric symbols is a first string of alphanumeric symbols, and wherein the control circuitry is further configured to:

retrieve a second string of alphanumeric symbols corresponding to a second content item, wherein the second string of alphanumeric symbols comprises a third word and a fourth word; and associate the second content item with the index string of keystrokes in response to determining that the first prefix matches the third word and that the second prefix matches the fourth word.

15. The system of claim 14, wherein generating for display the content item comprises generating for display a first listing corresponding to the first content item and a second listing corresponding to the second content item.

16. The system of claim 14, wherein associating the second content item with the index string of keystrokes comprises:

determining an ordering criteria associated with the first content item and the second content item;

determining a first ranking score for the first content item and a second ranking score for the second content item based on the ordering criteria; and associating the first ranking score with the first content item and the second ranking score with the second content item.

17. The system of claim 16, wherein the ordering criteria includes at least one of a temporal relevance, a location relevance, a popularity, and a personal preference.

18. The system of claim 16, wherein generating for display the content item comprises generating for display a first listing corresponding to the first content item and a second listing corresponding to the second content item, wherein the first listing and the second listing is ordered based on the ranking.

19. The system of claim 16, further comprising:

determining whether the first ranking score exceeds a threshold ranking score;

in response to determining that the first ranking score exceeds the threshold ranking score, associating the first content item with a first list of content items; and in response to determining that the first ranking score does not exceed the threshold ranking score, associating the first content item with a second list of content items.

20. The system of claim 19, wherein the first list of content items is stored on a first storage medium and wherein the second list of content items is stored on a second storage medium, wherein a first data retrieval speed of the first storage medium exceeds a second data retrieval speed of the second storage medium.

* * * * *